(12) United States Patent
Huang et al.

(10) Patent No.: US 8,593,471 B2
(45) Date of Patent: Nov. 26, 2013

(54) MEMORY ACCESS METHOD AND ACCESS CONTROLLER FOR A MEMORY

(75) Inventors: Jun Huang, Shenzhen (CN); Yu Liu, Shenzhen (CN)

(73) Assignee: Hisilicon Technologies Co., Ltd., Shenzhen (CN)

( * ) Notice: Subject to any disclaimer, the term of this patent is extended or adjusted under 35 U.S.C. 154(b) by 482 days.

(21) Appl. No.: 13/016,648

(22) Filed: Jan. 28, 2011

(65) Prior Publication Data

US 2011/0187729 A1 Aug. 4, 2011

(30) Foreign Application Priority Data

Feb. 3, 2010 (CN) .......................... 2010 1 0105869

(51) Int. Cl.
*G06F 13/18* (2006.01)
(52) U.S. Cl.
USPC .............................. 345/535; 345/533; 710/29
(58) Field of Classification Search
USPC ..................................... 345/533, 535; 710/29
See application file for complete search history.

(56) References Cited

U.S. PATENT DOCUMENTS

| 7,558,933 B2 | 7/2009 | Sita |
| 2004/0019738 A1 | 1/2004 | Kahn et al. |

FOREIGN PATENT DOCUMENTS

| CN | 1912857 A | 2/2007 |
| CN | 1975634 A | 6/2007 |

OTHER PUBLICATIONS

Office Action issued in corresponding Chinese Patent Application No. 201010105869.4, mailed Mar. 22, 2011.

*Primary Examiner* — Maurice L McDowell, Jr.
(74) *Attorney, Agent, or Firm* — Brinks Gilson & Lione (57) ABSTRACT

The method includes the following steps: monitoring an actual value of a relevant parameter of a display bandwidth of data to be output by the memory; comparing the actual value of the relevant parameter with a threshold to determine whether the actual display bandwidth meets predetermined requirements; and selecting an access arbitration mode for the memory according to whether the predetermined requirements are met. The access controller includes: a monitoring and comparing unit, adapted to monitor an actual value of a relevant parameter of a display bandwidth of data to be output by the memory and compare the actual value of the relevant parameter with a threshold to determine whether the actual display bandwidth meets predetermined requirements; and an arbitration adjusting unit, adapted to select an access arbitration mode for the memory according to whether the predetermined requirements are met.

20 Claims, 5 Drawing Sheets

MEMORY ACCESS METHOD AND ACCESS CONTROLLER FOR A MEMORY

CROSS-REFERENCE TO RELATED APPLICATION

This application claims priority to Chinese Patent Application No. 201010105869.4, filed on Feb. 3, 2010, which is hereby incorporated by reference in its entirety.

FIELD OF THE INVENTION

The present invention relates to the field of computer, in particular to an access method and an access controller for a memory, and most particularly to an access method and an access controller for a display memory.

BACKGROUND OF THE INVENTION

Currently, in consideration of the cost, the liquid crystal display module of high resolution (VGA or higher resolution) is not configured with a built-in frame buffer. Thus, the liquid crystal display module is required to continuously receive a sequence of display frames through a display interface at a certain rate. In the prior art, the rate is generally a fixed rate, that is, the display controller sends pixels to the display interface of the liquid crystal display at the configured fixed pixel rate. An access controller for a memory will authorize read/write rights to a display channel and other main channels accessing the memory based on a read/write efficiency first principle or a display highest priority principle. When the access controller for the memory uses an efficiency first arbitration policy to allocate a display bandwidth to the display channel, if there are heavy memory access loads in a period of time, it is not guaranteed that the display channel obtains enough memory bandwidth, possibly leading to the display image misalignment. When the access controller for the memory uses a priority arbitration policy and grants the display channel the highest priority, although the display image misalignment caused by the fact that the display channel cannot obtain enough bandwidth is avoided, serious bandwidth waste is brought to the memory access (low access efficiency), thus increasing the memory access power consumption.

SUMMARY OF THE INVENTION

The present invention is directed to an access method and an access controller for a memory, which solve the problem of display image misalignment or increased access power consumption caused by the single access arbitration policy in the prior art.

One embodiment of the present invention provides an access method for a memory, including the following steps: monitoring an actual value of a relevant parameter of a display bandwidth of data to be output by the memory; comparing the actual value of the relevant parameter with a threshold to determine whether the actual display bandwidth meets requirements; and selecting an access arbitration mode for the memory according to whether the requirements are met.

Another embodiment of the present invention provides an access controller for a memory, including: a monitoring and comparing unit, adapted to monitor an actual value of a relevant parameter of a display bandwidth of data to be output by the memory and compare the actual value of the relevant parameter with a threshold to determine whether the actual display bandwidth meets requirements; and an arbitration adjusting unit, adapted to select an access arbitration mode for the memory according to whether the requirements are met.

The embodiments of the present invention select the access arbitration mode according to the comparison result between the actual value of the display bandwidth with the required value, and adaptively adjust high memory access efficiency and display channel bandwidth according to the scenario, thus ensuring that the display image misalignment may not occur in a display system, and reducing the memory access power consumption of the display system.

BRIEF DESCRIPTION OF THE DRAWINGS

The accompanying drawings are illustrated here to provide further comprehension to the present invention, which are a part of the present invention, but do not limit the present invention.

DETAILED DESCRIPTION OF THE EMBODIMENTS

In order to make the objectives, technical solutions, and advantages of the present invention more comprehensible, the present invention is described in further detail below with reference to embodiments and the accompanying drawings. Here, the exemplary embodiments and illustration of the present invention are intended to explain the present invention, but not to limit the present invention.

Embodiment 1

Figure 1:
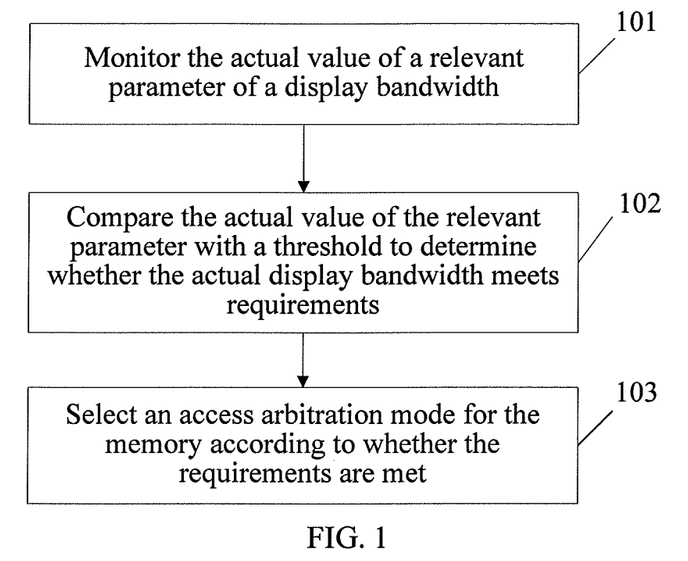
FIG. 1 is a flow chart of an access method for a memory according to Embodiment 1 of the present invention.

This embodiment provides an access method for a memory. As shown in FIG. 1, the method includes the following steps.

In Step 101, monitor an actual value of a relevant parameter of a display bandwidth of data to be output by the memory.

This step is performed by a monitoring and comparing unit. The relevant parameter may be a filling waterline of an input first-in-first-out memory (FIFO) of a display channel. The filling waterline is the amount of data which is written into the FIFO and not yet read. The filling waterline can be obtained by comparing a read address of the FIFO with a write address of the FIFO as follows.

When the write address is greater than or equal to the read address, filling waterline=write address−read address;

When the write address is less than the read address, filling waterline=depth of FIFO−read address+write address.

The relevant parameter may also be an average transmission delay of the display channel. The average transmission delay is the average time from sending a read request to returning a first read data on a display controller bus. The average transmission delay can be obtained by monitoring and then averaging the total time consumed by multiple times of requesting and returning.

In Step 102, compare the actual value of the relevant parameter with a threshold to determine whether the actual display bandwidth meets requirements.

This step is performed by the monitoring and comparing unit. If the actual display bandwidth is less than the required bandwidth, the waterline of the FIFO gradually reduces. If the actual display bandwidth is greater than the required bandwidth, the waterline of the FIFO gradually increases. In the case that the waterline of the FIFO is filled up or constant, the actual bandwidth matches the required bandwidth. The actual value and the required value of the display bandwidth can be compared by setting a threshold and the waterline of the FIFO.

Alternatively, the actual value and the required value of the display bandwidth can be compared by setting a threshold and the average transmission delay of the display channel.

In Step 103, select an access arbitration mode for the memory according to whether the requirements are met.

This step is performed by an adjusting unit. If the actual display bandwidth does not meet the requirements, the access arbitration for the memory is carried out in a display first mode; if the actual display bandwidth meets the requirements, the access arbitration for the memory is carried out in an efficiency first mode.

Moreover, this embodiment can further monitor the actual rate of a display interface and compare the actual rate of the display interface with a maximum bandwidth of the display channel. If the actual rate of the display interface is greater than the maximum bandwidth of the display channel, the rate of the display interface is reduced; if the actual rate of the display interface is less than or equal to the maximum bandwidth of the display channel after the rate of the display interface is reduced, the reduction of the rate of the display interface is canceled.

This embodiment of the present invention selects the access arbitration mode according to the result of comparing the actual value of the display bandwidth with the required value, and adaptively adjusts the high memory access efficiency and display channel bandwidth according to the scenario, thus ensuring that the display image misalignment may not occur in a display system, and reducing the access power consumption of the display system.

Embodiment 2

Figure 2:
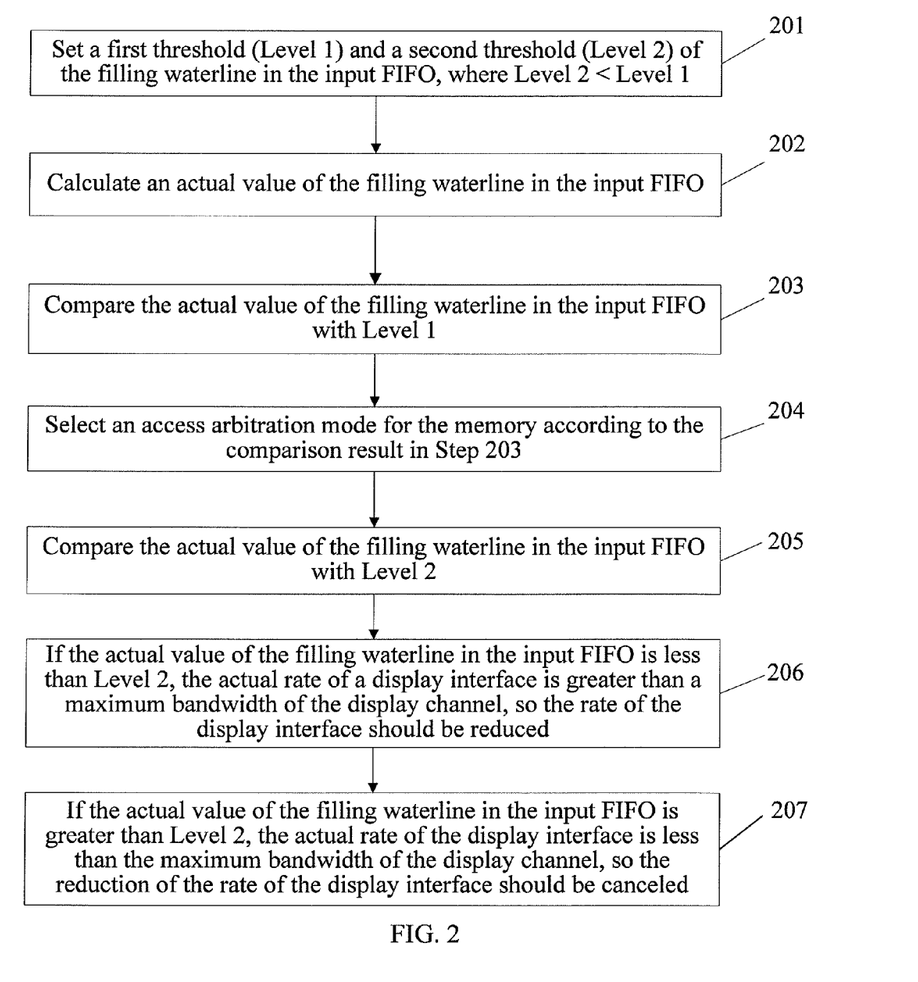
FIG. 2 is a flow chart of an access method for a memory according to Embodiment 2 of the present invention.

This embodiment provides an access method for a memory, which is achieved by using a filling waterline of the FIFO. As shown in FIG. 2, the method includes the following steps.

In Step 201, set a first threshold (Level 1) and a second threshold (Level 2) of the filling waterline in the input FIFO of the display channel, where Level 2<Level 1. The threshold setting must satisfy the following conditions. The time for the display interface to transmit (Level 1-Level 2) data is greater than the sum of the time for adjusting the arbitration mode and the delay of data transfer from an arbitrator to the FIFO. The time for the display interface to transmit Level 2 data must be greater than the time for adjusting the rate of the display interface.

In Step 202, calculate an actual value of the filling waterline in the input FIFO. The filling waterline is the amount of data which is written into the FIFO and not yet read. The filling waterline can be obtained by comparing the read address of the FIFO with the write address of the FIFO. When the write address is greater than or equal to the read address, filling waterline=write address−read address. When the write address is less than the read address, filling waterline=depth of FIFO−read address+write address.

In Step 203, compare the actual value of the filling waterline in the input FIFO with Level 1.

In Step 204, select an access arbitration mode for the memory according to the comparison result in Step 203. If the actual value of the filling waterline in the FIFO is greater than or equal to Level 1, the actual display bandwidth meets the requirements, so the access arbitration for the memory is carried out in an efficiency first mode; if the actual value of the filling waterline in the input FIFO is less than Level 1, the actual display bandwidth does not meet the requirements, so the access arbitration for the memory is carried out in a display first mode.

In Step 205, compare the actual value of the filling waterline in the input FIFO with Level 2.

In Step 206, if the actual value of the filling waterline in the input FIFO is less than Level 2, the actual rate of a display interface is greater than a maximum bandwidth of the display channel, so the rate of the display interface should be reduced.

In Step 207, if the actual value of the filling waterline in the input FIFO is greater than or equal to Level 2, the actual rate of the display interface is less than or equal to the maximum bandwidth of the display channel, so the reduction of the rate of the display interface should be canceled.

This embodiment uses one-stage threshold comparison. This embodiment compares the actual value of the display bandwidth with the required value by using the filling waterline of the FIFO, selects the access arbitration mode according to the comparison result, and adaptively adjusts the high memory access efficiency and display channel bandwidth according to the scenario, thus ensuring that the display image misalignment may not occur in the display system, and reducing the access power consumption of the display bandwidth. Moreover, this embodiment avoids the display image misalignment by adjusting the rate of the interface in the display first mode.

Embodiment 3

Figure 3:
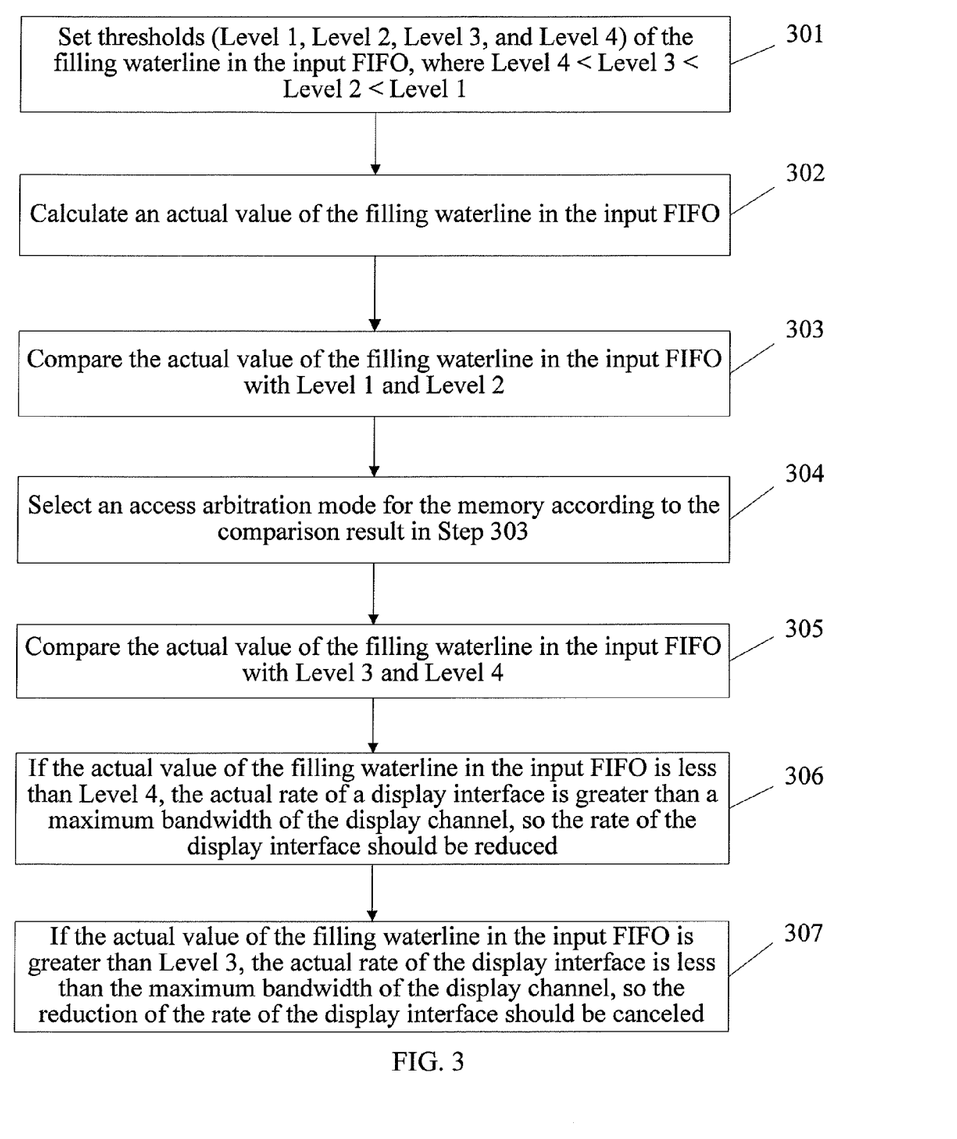
FIG. 3 is a flow chart of an access method for a memory according to Embodiment 3 of the present invention.

This embodiment provides an access method for a memory, which is achieved by using a filling waterline of the FIFO. As shown in FIG. 3, the method includes the following steps.

In Step 301, set a first threshold (Level 1), a second threshold (Level 2), a third threshold (Level 3), and a fourth threshold (Level 4) of the filling waterline in the input FIFO, where Level 4 <Level 3<Level 2<Level 1. The setting must satisfy the following conditions. The time for the display interface to transmit (Level 1-Level 2) data is greater than the sum of the time for adjusting the arbitration mode and the delay of data transfer from an arbitrator to the FIFO. The time for the display interface to transmit (Level 3-Level 4) data must be greater than the time for adjusting the rate of the display interface.

In Step 302, calculate an actual value of the filling waterline in the input FIFO. The filling waterline is the amount of data which is written into the FIFO and not yet read. The filling waterline can be obtained by comparing the read address of the FIFO with the write address of the FIFO. When the write address is greater than or equal to the read address, filling waterline=write address−read address. When the write address is less than the read address, filling waterline=depth of FIFO−read address+write address.

In Step 303, compare the actual value of the filling waterline in the input FIFO with Level 1 and Level 2.

In Step 304, select an access arbitration mode for the memory according to the comparison result in Step 303. If the actual value of the filling waterline in the FIFO is greater than or equal to Level 1, the actual display bandwidth meets the requirements, so the access arbitration for the memory is carried out in an efficiency first mode; if the actual value of the filling waterline in the input FIFO is less than Level 2, the actual display bandwidth does not meet the requirements, so the access arbitration for the memory is carried out in a display first mode.

In Step 305, compare the actual value of the filling waterline in the input FIFO with Level 3 and Level 4.

In Step 306, if the actual value of the filling waterline in the input FIFO is less than Level 4, the actual rate of a display interface is greater than a maximum bandwidth of the display channel, so the rate of the display interface should be reduced.

In Step 307, if the actual value of the filling waterline in the input FIFO is greater than Level 3, the actual rate of the display interface is less than or equal to the maximum bandwidth of the display channel, so the reduction of the rate of the display interface should be canceled.

This embodiment uses two-stage threshold comparison. This embodiment compares the actual value of the display bandwidth with the required value by using the filling waterline of the FIFO, selects the access arbitration mode according to the comparison result, and adaptively adjusts the high memory access efficiency and display channel bandwidth according to the scenario, thus ensuring that the display image misalignment may not occur in the display system, and reducing the access power consumption of the display bandwidth. Moreover, this embodiment avoids the display image misalignment by adjusting the interface rate in the display first mode.

Embodiment 4

Figure 4:
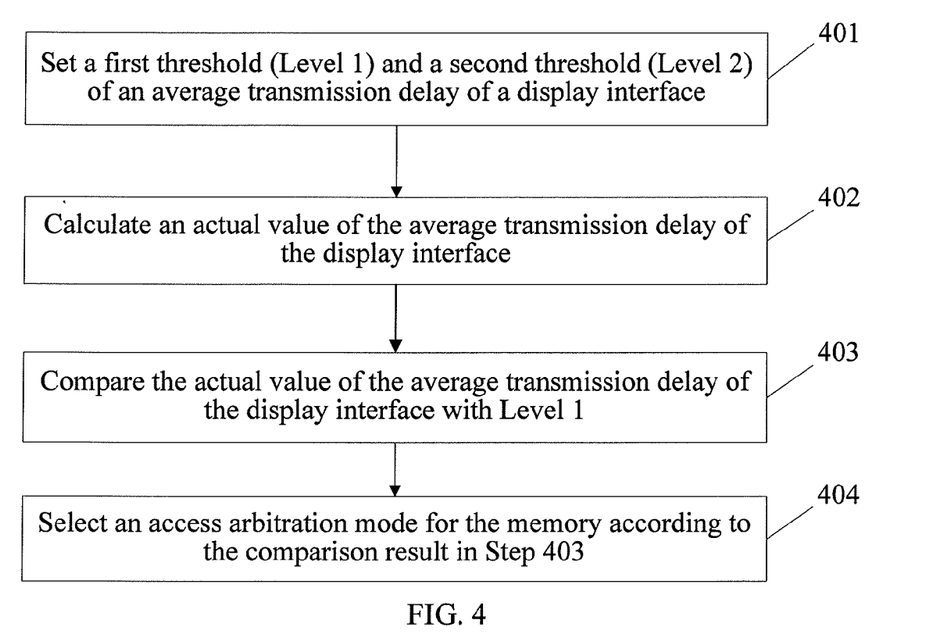
FIG. 4 is a flow chart of an access method for a memory according to Embodiment 4 of the present invention.

This embodiment provides an access method for a memory, which is achieved by using an average transmission delay of the display interface. As shown in FIG. 4, the method includes the following steps.

In Step 401, set a first threshold (Level 1) and a second threshold (Level 2) of an average transmission delay of a display interface.

In Step 402, calculate an actual value of the average transmission delay of the display interface. The average transmission delay is the average time from sending a read request to returning a first read data on a display controller bus. The average transmission delay can be obtained by monitoring and averaging multiple values of the requesting-to-returning time.

In Step 403, compare the actual value of the average transmission delay of the display interface with Level 1. The threshold Level 1 of the average transmission delay is the required display bandwidth and the upper limit that the transmission delay of the display channel cannot exceed.

In Step 404, select an access arbitration mode for the memory according to the comparison result in Step 403. If the actual value of the average transmission delay of the display interface is less than or equal to Level 1, the actual display bandwidth meets the requirements, so the access arbitration for the memory is carried out in an efficiency first mode; if the actual value of the average transmission delay of the display interface is greater than Level 1, the actual display bandwidth does not meet the requirements, so the access arbitration for the memory is carried out in a display first mode.

After the access arbitration for the memory is carried out in the display first mode, if the actual value of the average transmission delay of the display channel is still greater than Level 1, the actual rate of the display interface is greater than the maximum bandwidth of the display channel, so the rate of the display interface should be reduced.

If the comparison result is that the actual value of the average transmission delay is still less than Level 1, further compare the difference obtained by subtracting the actual value from Level 1 with Level 2. If the difference is greater than or equal to Level 2, the actual rate of the display interface is less than or equal to the maximum bandwidth of the display channel, so the reduction of the rate of the display interface should be canceled.

In this embodiment, the access arbitration mode can be indicated as the efficiency first mode during initialization. Moreover, this embodiment can also use the two-stage threshold to select the access arbitration mode for the memory. The specific procedure is to set a threshold value 1 and a threshold value 2, in which the threshold value 1 is greater than the threshold value 2. When the average transmission delay is greater than the threshold value 1, the arbitration mode indication is adjusted to the "display first" mode. When the average transmission delay is less than the threshold value 2, the arbitration mode indication is adjusted to the "efficiency first" mode.

This embodiment uses the one-stage threshold comparison. This embodiment compares the actual value of the display bandwidth with the required value by using the average transmission delay of the display interface, selects the access arbitration mode according to the comparison result, and adaptively adjusts the high memory access efficiency and display channel bandwidth according to the scenario, thus ensuring that the display image misalignment does not exist in the display system, and reducing the access power consumption of the display bandwidth. Moreover, this embodiment avoids the display image misalignment by adjusting the interface rate in the display first mode.

Embodiment 5

Figure 5:
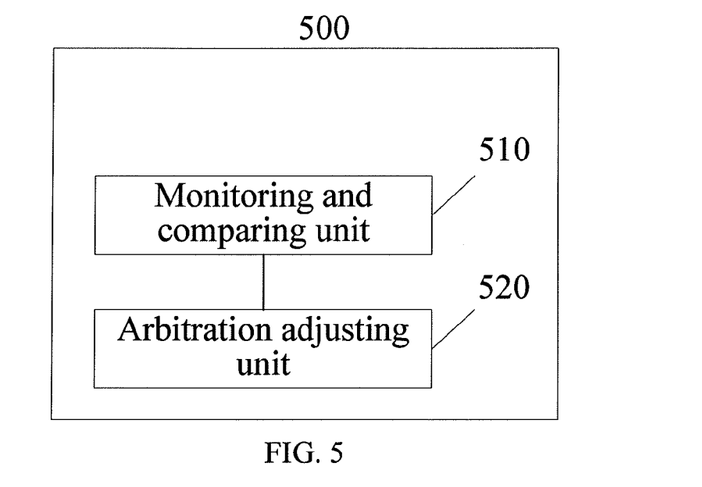
FIG. 5 is a structural schematic diagram of an access controller for a memory according to Embodiment 5 of the present invention.

This embodiment provides an access controller for a memory. As shown in FIG. 5, the access controller 500 includes a monitoring and comparing unit 510 and an arbitration adjusting unit 520.

The monitoring and comparing unit 510 is adapted to monitor an actual value of a relevant parameter of a display bandwidth of data to be output by the memory and compare the actual value of the relevant parameter with a threshold to determine whether the actual display bandwidth meets requirements.

The arbitration adjusting unit 520 is adapted to select an access arbitration mode for the memory according to whether the requirements are met.

Here, if the actual display bandwidth does not meet the requirements, the arbitration adjusting unit 520 is adapted to carry out the access arbitration for the memory in a display first mode; if the actual display bandwidth meets the requirement, the arbitration adjusting unit 520 carries out the access arbitration for the memory in an efficiency first mode.

Moreover, the access controller for the memory provided in this embodiment also includes a rate adjusting unit 530 adapted to adjust the rate of a display interface.

The monitoring unit 510 also monitors the actual rate of the display interface and compares the actual rate of the display interface with a maximum bandwidth of a display channel. If the actual rate of the display interface is greater than the maximum bandwidth of the display channel, the rate adjusting unit 530 reduces the rate of the display interface. If the actual rate of the display interface is less than or equal to the maximum bandwidth of the display channel, the rate adjusting unit 530 cancels the reduction of the rate of the display interface.

Figure 6:
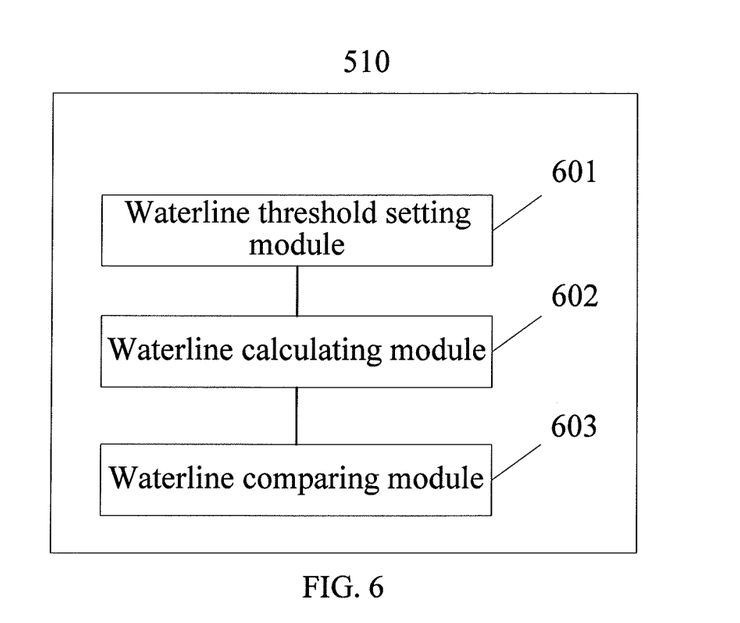
FIG. 6 is a structural schematic diagram of a monitoring unit according to Embodiment 5 of the present invention.

As shown in FIG. 6, the monitoring unit 510 may be an underflow pre-alert judging unit, and further includes a waterline threshold setting module 601, a waterline calculating module 602, and a waterline comparing module 603.

The waterline threshold setting module 601 is adapted to set a first threshold (Level 1) and a second threshold (Level 2) of the filling waterline of the FIFO, where Level 1>Level 2. The setting must satisfy the following conditions. The time for the display interface to transmit (Level 1-Level 2) data is greater than the sum of the time for adjusting the arbitration mode and the delay of data transfer from an arbitrator to the FIFO. The time for the display interface to transmit Level 2 data must be greater than the time for adjusting the rate of the display interface.

The waterline calculating module 602 is adapted to calculate the actual value of the filling waterline of the FIFO. The filling waterline is the amount of data which is written into the FIFO and not yet read. The filling waterline can be obtained by comparing the read address of the FIFO with the write address of the FIFO. When the write address is greater than or equal to the read address, filling waterline=write address−read address. When the write address is less than the read address, filling waterline=depth of FIFO−read address+write address.

The waterline comparing module 603 is adapted to compare the actual value of the filling waterline of the FIFO with Level 1 and Level 2. If the actual display bandwidth is less than the required bandwidth, the waterline of the FIFO gradually reduces. If the actual display bandwidth is greater than the required bandwidth, the waterline of the FIFO gradually increases. In the case that the waterline of the FIFO is filled up or constant, the actual bandwidth matches the required bandwidth. The waterline comparing module 603 first compares the actual value of the filling waterline of the FIFO with Level 1. If the actual value of the filling waterline of the FIFO is greater than Level 1, the actual display bandwidth meets the requirements. If the actual value of the filling waterline of the FIFO is less than Level 1, the actual display bandwidth does not meet the requirements. When the actual value of the filling waterline of the FIFO is less than Level 1, the waterline comparing module 603 continues to compare the actual value of the filling waterline of the FIFO with Level 2. If the actual value of the filling waterline of the FIFO is less than Level 2, the actual rate of the display interface is greater than the maximum bandwidth of the display channel, so the rate adjusting unit 530 reduces the rate of the display interface. If the actual value of the filling waterline of the FIFO is greater than or equal to Level 2, the actual rate of the display interface is less than or equal to the maximum bandwidth of the display channel, so the rate adjusting unit 530 cancels the reduction of the rate of the display interface.

Alternatively, the waterline threshold module 601 is adapted to set a first threshold (Level 1), a second threshold (Level 2), a third threshold (Level 3), and a fourth threshold (Level 4) of the filling waterline in the input FIFO, where Level 1>Level 2>Level 3>Level 4. The setting must satisfy the following conditions. The time for the display interface to transmit (Level 1-Level 2) data is greater than the sum of the time for adjusting the arbitration mode and the delay between the arbitrator and the FIFO. The time for the display interface to transmit (Level 3-Level 4) data must be greater than the time for adjusting the rate of the display interface. The waterline comparing module 603 is adapted to compare the actual value of the filling waterline of the FIFO with Level 1 and Level 2 respectively. If the actual value of the filling waterline of the FIFO is less than Level 2, the actual display bandwidth does not meet the requirements; if the actual value of the filling waterline of the FIFO is greater than or equal to Level 1, the actual display bandwidth meets the requirements. When the actual value of the filling waterline of the FIFO is less than Level 2, the waterline comparing module 603 continues to compare the actual value of the filling waterline of the FIFO with Level 3 and Level 4 respectively. If the actual value of the filling waterline of the FIFO is less than level 4, the actual rate of the display interface is greater than the maximum bandwidth of the display channel, so the rate adjusting unit 530 reduces the rate of the display interface; if the actual value of the filling waterline of the FIFO is greater than or equal to Level 3, the actual rate of the display interface is less than or equal to the maximum bandwidth of the display channel, so the rate adjusting unit 530 cancels the reduction of the rate of the display interface.

Figure 7:
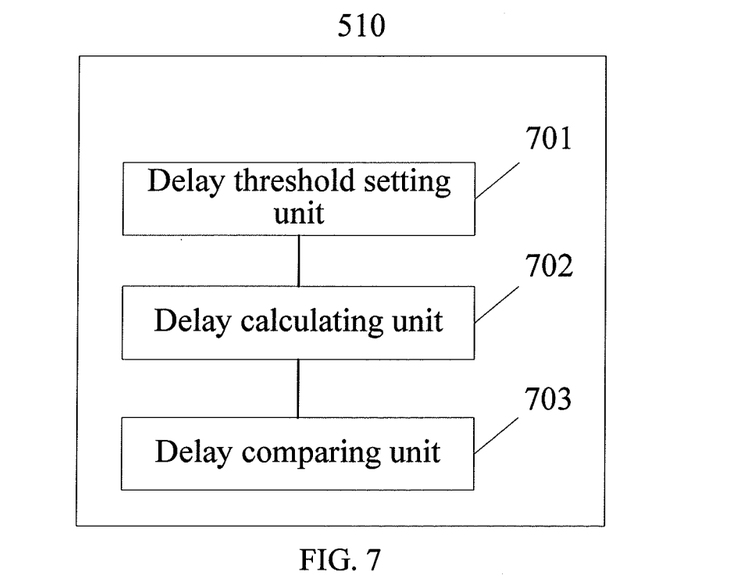
FIG. 7 is a structural schematic diagram of another monitoring unit according to Embodiment 5 of the present invention.

As shown in FIG. 7, the monitoring unit 510 may be a display bandwidth monitoring unit and further includes a delay threshold setting unit 701, a delay calculating unit 702, and a delay comparing unit 703.

The delay threshold setting unit 701 is adapted to set a first threshold (Level 1), a second threshold (Level 2) and a third threshold (Level 1) of the average transmission delay of the display interface, where Level 1>Level 2.

The delay calculating unit 702 is adapted to calculate the actual value of the average transmission delay. The average transmission delay is the average time from sending a read request to returning a first read data on a display controller bus. The average transmission delay can be obtained by monitoring and averaging multiple values of the requesting-to-returning time.

The delay comparing unit 703 is adapted to compare the actual value of the average transmission delay with Level 1 and Level 2 respectively. Therefore, if the actual value of the average transmission delay is greater than Level 1, the actual display bandwidth does not meet the requirements; if the actual value of the average transmission delay is less than or equal to Level 1, the actual display bandwidth meets the requirements. After the access arbitration for the memory is carried out in the display first mode, if it is obtained through comparison by the delay comparing unit 702 that the actual value of the average transmission delay is still greater than Level 1, the actual rate of the display interface is greater than the maximum bandwidth of the display channel. If it is obtained through the comparison by the delay comparing unit 702 that the actual value of the average transmission delay is still less than Level 1 and the difference between Level 1 and the actual value of the average transmission delay is greater than Level 2, the actual rate of the display interface is less than the maximum bandwidth of the display channel.

This embodiment of the present invention compares the actual value with the required value of the display bandwidth by using the filling waterline of the FIFO and the average transmission delay of the display channel, selects the access arbitration mode according to the result of the comparison, and adaptively adjusts the high memory access efficiency and display channel bandwidth according to the scenario, thus ensuring that the display image misalignment does not occur in the display system, and reducing the access power consumption of the display bandwidth.

The objectives, technical solutions, and beneficial effects of the present invention have been described in further detail through the above specific embodiments. It should be understood that the above descriptions are merely specific embodiments of the present invention, but not intended to limit the present invention. Any modification, equivalent replacement, or improvement made without departing from the spirit and principle of the present invention should fall within the scope of the present invention.

What is claimed is:

1. An access method for a memory, comprising:
monitoring an actual value of a relevant parameter of a display bandwidth of data to be output by the memory;
comparing the actual value of the relevant parameter with a threshold to determine whether the actual display bandwidth meets predetermined requirements; and
selecting an access arbitration mode for the memory according to whether the predetermined requirements are met.

2. The method according to claim 1, wherein the step of selecting the access arbitration mode for the memory according to whether the requirements are met comprises:
carrying out access arbitration for the memory in a display first mode if the actual display bandwidth does not meet the predetermined requirements; and
carrying out access arbitration for the memory in an efficiency first mode if the actual display bandwidth meets the predetermined requirements.

3. The method according to claim 2, further comprising:
comparing the actual value of the relevant parameter with another threshold to determine an actual rate of a display interface of the memory;
reducing the rate of the display interface if the actual rate of the display interface is greater than a maximum bandwidth of a display channel of the memory; and
canceling the reduction of the rate of the display interface if the actual rate of the display interface is less than the maximum bandwidth of the display channel of the memory.

4. The method according to claim 2,
wherein the relevant parameter is a filling waterline in a first-in-first-out memory of the display channel; and
wherein the step of comparing the actual value of the relevant parameter with a threshold to determine whether the actual display bandwidth meets the predetermined requirements comprises:
setting a first threshold of the filling waterline in the first-in-first-out memory of the display channel,
comparing an actual value of the filling waterline in the first-in-first-out memory of the display channel with the first threshold,
if the actual value of the filling waterline in the first-in-first-out memory of the display channel is less than the first threshold, determining that the actual display bandwidth does not meet the predetermined requirements; and
if the actual value of the filling waterline in the first-in-first-out memory of the display channel is greater than the first threshold, determining that the actual display bandwidth meets the predetermined requirements.

5. The method according to claim 4, the step of comparing the actual value of the relevant parameter with a threshold to determine whether the actual display bandwidth meets the predetermined requirements further comprising:
setting a second threshold of the filling waterline in the first-in-first-out memory of the display channel, wherein the second threshold is less than the first threshold;
comparing the actual value of the filling waterline in the first-in-first-out memory of the display channel with the second threshold;
if the actual value of the filling waterline in the first-in-first-out memory of the display channel is less than the second threshold, determining that the actual rate of the display interface is greater than the maximum bandwidth of the display channel of the memory; and
if the actual value of the filling waterline in the first-in-first-out memory of the display channel is greater than the second threshold, determining that the actual rate of the display interface is less than the maximum bandwidth of the display channel of the memory.

6. The method according to claim 2, wherein:
the relevant parameter is a filling waterline in a first-in-first-out memory of the display channel;
the step of comparing the actual value of the relevant parameter with a threshold to determine whether the actual display bandwidth meets the predetermined requirements comprises:
setting a first threshold and a second threshold of the filling waterline in the first-in-first-out memory of the display channel, wherein the first threshold is greater than the second threshold;
comparing an actual value of the filling waterline in the first-in-first-out memory of the display channel with the first threshold and the second threshold respectively;
if the filling waterline in the first-in-first-out memory of the display channel is less than the second threshold, determining that the actual display bandwidth does not meet the predetermined requirements; and
if the filling waterline in the first-in-first-out memory of the display channel is greater than the first threshold, determining that the actual display bandwidth meets the predetermined requirements.

7. The method according to claim 6, the step of comparing the actual value of the relevant parameter with a threshold to determine whether the actual display bandwidth meets the predetermined requirements further comprising:
setting a third threshold and a fourth threshold of the filling waterline in the first-in-first-out memory of the display channel, wherein the third threshold is greater than the fourth threshold and less than the second threshold;
comparing the actual value of the filling waterline in the first-in-first-out memory of the display channel with the third threshold and the fourth threshold respectively;
if the filling waterline in the first-in-first-out memory of the display channel is less than the fourth threshold, determining that the actual rate of the display interface is greater than the maximum bandwidth of the display channel of the memory; and
if the filling waterline in the first-in-first-out memory of the display channel is greater than the third threshold, determining that the actual rate of the display interface is less than the maximum bandwidth of the display channel of the memory.

8. The method according to claim 2, wherein, the relevant parameter is an average transmission delay;
the step of comparing the actual value of the relevant parameter with a threshold to determine whether the actual display bandwidth meets the predetermined requirements comprising:
setting a first threshold of the average transmission delay of the display channel; and
comparing an actual value of the average transmission delay of the display channel with the first threshold;

if the actual value of the average transmission delay of the display channel is greater than the first threshold, the actual display bandwidth does not meet the predetermined requirements; and if the actual value of the average transmission delay of the display channel is less than the first threshold, the actual display bandwidth meets the predetermined requirements.

9. The method according to claim 2, wherein the relevant parameter is an average transmission delay;

the step of comparing the actual value of the relevant parameter with a threshold to determine whether the actual display bandwidth meets the predetermined requirements comprising:

setting a first threshold and a second threshold of the average transmission delay of the display channel, wherein the first threshold is greater than the second threshold;

comparing an actual value of the average transmission delay of the display channel with the first threshold and the second threshold respectively;

if the actual value of the average transmission delay of the display channel is greater than the first threshold, determining that the actual display bandwidth does not meet the predetermined requirements; and if the actual value of the average transmission delay of the display channel is less than the second threshold, determining that the actual display bandwidth meets the predetermined requirements.

10. The method according to claim 9, further comprising:

after the access arbitration for the memory is carried out in the display first mode, if the actual value of the average transmission delay of the display channel is still greater than the first threshold, determining that the actual rate of the display interface is greater than the maximum bandwidth of the display channel.

11. An access controller for a memory, comprising:

a monitoring and comparing unit, adapted to monitor an actual value of a relevant parameter of a display bandwidth of data to be output by the memory and compare the actual value of the relevant parameter with a threshold to determine whether the actual display bandwidth meets predetermined requirements; and an arbitration adjusting unit, adapted to select an access arbitration mode for the memory according to whether the predetermined requirements are met.

12. The access controller according to claim 11, wherein if the actual display bandwidth does not meet the predetermined requirements, the arbitration adjusting unit carries out access arbitration for the memory in a display first mode; and if the actual display bandwidth meets the predetermined requirements, the arbitration adjusting unit carries out access arbitration for the memory in an efficiency first mode.

13. The access controller according to claim 12, further comprising:

a rate adjusting unit, adapted to adjust a rate of a display interface of the memory;

wherein the monitoring and comparing unit:

further compares the actual value of the relevant parameter with another threshold to determine a working state of the actual rate of the display interface;

if the actual rate of the display interface is greater than a maximum bandwidth of a display channel, the rate adjusting unit reduces the rate of the display interface; and if the actual rate of the display interface is less than the maximum bandwidth of the display channel, the rate adjusting unit cancels the reduction of the rate of the display interface.

14. The access controller according to claim 12, wherein:

the monitoring and comparing unit is an underflow pre-alert judging unit and further comprises:

a waterline threshold setting module, adapted to set a first threshold of a filling waterline in a first-in-first-out memory of the display channel;

a waterline calculating module, adapted to calculate an actual value of the filling waterline in the first-in-first-out memory of the display channel; and a waterline comparing unit, adapted to compare the actual value of the filling waterline in the first-in-first-out memory of the display channel with the first threshold;

wherein the waterline comparing unit is further adapted to:

if the actual value of the filling waterline in the first-in-first-out memory of the display channel is less than the first threshold, determine that the actual display bandwidth does not meet the predetermined requirements; and if the actual value of the filling waterline in the first-in-first-out memory of the display channel is greater than the first threshold, determine that the actual display bandwidth meets the predetermined requirements.

15. The access controller according to claim 14, wherein:

the waterline threshold setting module is further adapted to set a second threshold of the filling waterline in the first-in-first-out memory of the display channel, wherein the second threshold is less than the first threshold; and the waterline comparing unit is further adapted to:

compare the actual value of the filling waterline in the first-in-first-out memory of the display channel with the second threshold; and if the actual value of the filling waterline in the first-in-first-out memory of the display channel is less than the second threshold, determine that the actual rate of the display interface is greater than the maximum bandwidth of the display channel of the memory.

16. The access controller according to claim 12, wherein:

the monitoring and comparing unit is an underflow pre-alert judging unit and further comprises:

a waterline threshold setting module, adapted to set a first threshold and a second threshold of a filling waterline in a first-in-first-out memory of the display channel;

a waterline calculating module, adapted to calculate an actual value of the filling waterline in the first-in-first-out memory of the display channel; and a waterline comparing unit, adapted to compare the actual value of the filling waterline in the first-in-first-out memory of the display channel with the first threshold and the second threshold respectively;

if the actual value of the filling waterline in the first-in-first-out memory of the display channel is less than the second threshold, determine that the actual display bandwidth does not meet the predetermined requirements; and if the actual value of the filling waterline in the first-in-first-out memory of the display channel is greater than the first threshold, determine that the actual display bandwidth meets the predetermined requirements.

17. The access controller according to claim 16, wherein:

the waterline threshold setting module is further adapted to set a third threshold and a fourth threshold of the filling waterline in the first-in-first-out memory of the display channel, wherein the third threshold is greater than the fourth threshold and less than the second threshold; and the waterline comparing unit is further adapted to:
compare the actual value of the filling waterline in the first-in-first-out memory of the display channel with the third threshold and the fourth threshold respectively;
if the filling waterline in the first-in-first-out memory of the display channel is less than the fourth threshold, determine that the actual rate of the display interface is greater than the maximum bandwidth of the display channel of the memory; and
if the filling waterline in the first-in-first-out memory of the display channel is greater than the third threshold, determine that the actual rate of the display interface is less than the maximum bandwidth of the display channel of the memory.

18. The access controller according to claim 12, wherein:
the monitoring and comparing unit is a display bandwidth monitoring unit and further comprises:
a delay threshold setting unit, adapted to set a first threshold of an average transmission delay of the display channel;
a delay calculating unit, adapted to calculate an actual value of the average transmission delay of the display channel; and
a delay comparing unit, adapted to:
compare the actual value of the average transmission delay of the display channel with the first threshold;
if the actual value of the average transmission delay of the display channel is greater than the first threshold, determine that the actual display bandwidth does not meet the predetermined requirements; and
if the actual value of the average transmission delay of the display channel is less than the first threshold, determine that the actual display bandwidth meets the predetermined requirements.

19. The access controller according to claim 12, wherein:
the monitoring and comparing unit is a display bandwidth monitoring unit and further comprises:
a delay threshold setting unit, adapted to set a first threshold and a second threshold of an average transmission delay of the display channel, wherein the first threshold is greater than the second threshold;
a delay calculating unit, adapted to calculate an actual value of the average transmission delay of the display channel; and
a delay comparing unit, adapted to:
compare the actual value of the average transmission delay of the display channel with the first threshold and the second threshold respectively;
if the actual value of the average transmission delay of the display channel is greater than the first threshold, determine that the actual display bandwidth does not meet the predetermined requirements; and
if the actual value of the average transmission delay of the display channel is less than the second threshold, determine that the actual display bandwidth meets the predetermined requirements.

20. The access controller according to claim 19, wherein:
after the access arbitration for the memory is carried out in the display first mode, if it is obtained through the comparison by the delay comparing unit that the actual value of the average transmission delay of the display channel is still greater than the first threshold, the delay comparing unit is further operable to determine that an actual rate of a display interface is greater than a maximum bandwidth of the display channel.

* * * * *